United States Patent
Cha (10) Patent No.: US 8,266,668 B2
(45) Date of Patent: Sep. 11, 2012

(54) BROADCAST RECEIVER, DATA STRUCTURE, AND METHOD FOR PROVIDING DIAGNOSTIC INFORMATION

(75) Inventor: Sang Hoon Cha, Seoul (KR)

(73) Assignee: LG Electronics Inc., Seoul (KR)

( * ) Notice: Subject to any disclaimer, the term of this patent is extended or adjusted under 35 U.S.C. 154(b) by 740 days.

(21) Appl. No.: 11/480,536

(22) Filed: Jul. 5, 2006

(65) Prior Publication Data

US 2007/0101395 A1 May 3, 2007

(30) Foreign Application Priority Data

Nov. 2, 2005 (KR) .................. 10-2005-0104280

(51) Int. Cl.
 *H04N 7/16* (2006.01)
(52) U.S. Cl. .................. 725/139; 725/131; 725/151
(58) Field of Classification Search .................. 725/100, 725/131, 139, 151
 See application file for complete search history.

(56) References Cited

U.S. PATENT DOCUMENTS

| | | | |
|---|---|---|---|
| 6,212,483 B1* | 4/2001 | Carew et al. .................. 702/183 |
| 2002/0054750 A1* | 5/2002 | Ficco et al. .................. 386/46 |
| 2003/0206719 A1 | 11/2003 | Bumgardner et al. |
| 2005/0015813 A1 | 1/2005 | Yun |
| 2006/0059391 A1* | 3/2006 | Park .................. 714/48 |
| 2007/0050836 A1* | 3/2007 | Stanek et al. .................. 725/131 |

FOREIGN PATENT DOCUMENTS

| | | |
|---|---|---|
| EP | 0 508 394 A2 | 10/1992 |
| WO | WO 01/82598 A2 | 11/2001 |
| WO | WO 2004/100539 A1 | 11/2004 |

OTHER PUBLICATIONS

Society of Cable Telecommunications Engineers: "Host-Pod Interface Standard-Host-Pod Interface Specification" Internet Citation, [Online] 2003, XP002408006. Retrieved from the Internet: URL: http://www.scte.org/documents/pdf/ansiscte282003dvs295.pdf.*
Society of Cable Telecommunications Engineers, "Host-POD Interface Standard-Host POD Interface Specification", Internet citation, [online] Oct. 27, 2003, XP002408006, retrieved the Internet: URL: http//www.scte.org/documents/pdf/ANSISCTE282003DVS295. pdf, [retrieved on Nov. 17, 2006].
OpenCable Specifications, Host 2.0 DVR Extenstion, OC-SP-HOST2-DVREXT-101-050502, May 2, 2005.
OpenCable Specifications, Multi-Stream CableCARD Interface, OC-SP-MC-IF-CO1-050331, Mar. 31, 2005.

* cited by examiner

*Primary Examiner* — Brian Pendleton
*Assistant Examiner* — Nnenna Ekpo
(74) *Attorney, Agent, or Firm* — McKenna Long & Aldridge LLP (57) ABSTRACT

A host is configured to communicate with a video data recording device. The host includes a host controller configured to receive a video data recording device diagnostic information request originated external to the host. The host controller further configured to collect the video data recording device diagnostic information from the video data recording device in response to the external request.

12 Claims, 7 Drawing Sheets

| Syntax | No. of Bits | Mnemonic |
|---|---|---|
| diagnostic_cnf() { | | |
|   diagnostic_cnf_tag | 24 | uimsbf |
|   length_field() | | |
|   number_of_diag | 8 | uimsbf |
|   for (i=0; i<number_of_diag; i++) { | | |
|     diagnostic_id | 8 | uimsbf |
|     status_field | 8 | uimsbf |
|     if (status_field == 0x00) { | | |
|       if (diagnostic_id == 0x00) { | | |
|         memory_report() | | |
|       } | | |
|       if (diagnostic_id == 0x01) { | | |
|         software_ver_report() | | |
|       } | | |
|       if (diagnostic_id == 0x02) { | | |
|         firmware_ver_report() | | |
|       } | | |
|       if (diagnostic_id == 0x03) { | | |
|         MAC_address_report() | | |
|       } | | |
|       if (diagnostic_id == 0x04) { | | |
|         FAT_status_report() | | |
|       } | | |
|       if (diagnostic_id == 0x05) { | | |
|         FDC_status_report() | | |
|       } | | |
|       if (diagnostic_id == 0x06) { | | |
|         current_channel_report() | | |
|       } | | |
|       if (diagnostic_id == 0x07) { | | |
|         1394_port_report() | | |
|       } | | |
|       if (diagnostic_id == 0x08) { | | |
|         DVI_status report() | | |
|       } | | |
|       if (diagnostic_id == 0x09) { | | |
|         eCM_status report() | | |
|       } | | |
|       if (diagnostic_id == 0x0A) { | | |
|         HDMI port status report() | | |
|       } | | |
|       if (diagnostic_id == 0x0B) { | | |
|         RDC status report() | | |
|       } | | |
|       if (diagnostic_id == 0x0C) { | | |
|         net address report() | | |
|       } | | |
|       if (diagnostic_id == 0x0D) { | | |
|         DVR_status_report() | | |
|       } | | |
|     } | | |
|   } | | |
| } | | |

FIG. 4

| Syntax | No. of Bits | Mnemonic |
|---|---|---|
| diagnostic_cnf() { | | |
|   diagnostic_cnf_tag | 24 | uimsbf |
|   length_field() | | |
|   number_of_diag | 8 | uimsbf |
|   for (i=0; i<number_of_diag; i++) { | | |
|     diagnostic_id | 8 | uimsbf |
|     ltsid | 8 | uimsbf |
|     status_field | 8 | uimsbf |
|     if (status_field == 0x00) { | | |
|       if (diagnostic_id == 0x00) { | | |
|         memory_report() | | |
|       } | | |
|       if (diagnostic_id == 0x01) { | | |
|         software_ver_report() | | |
|       } | | |
|       if (diagnostic_id == 0x02) { | | |
|         firmware_ver_report() | | |
|       } | | |
|       if (diagnostic_id == 0x03) { | | |
|         MAC_address_report() | | |
|       } | | |
|       if (diagnostic_id == 0x04) { | | |
|         FAT_status_report() | | |
|       } | | |
|       if (diagnostic_id == 0x05) { | | |
|         FDC_status_report() | | |
|       } | | |
|       if (diagnostic_id == 0x06) { | | |
|         current_channel_report() | | |
|       } | | |
|       if (diagnostic_id == 0x07) { | | |
|         1394_port_report() | | |
|       } | | |
|       if (diagnostic_id == 0x08) { | | |
|         DVI_status report() | | |
|       } | | |
|       if (diagnostic_id == 0x09) { | | |
|         eCM_status report() | | |
|       } | | |
|       if (diagnostic_id == 0x0A) { | | |
|         HDMI port status report() | | |
|       } | | |
|       if (diagnostic_id == 0x0B) { | | |
|         RDC status report() | | |
|       } | | |
|       if (diagnostic_id == 0x0C) { | | |
|         net address report() | | |
|       } | | |
|       if (diagnostic_id == 0x0D) { | | |
|         DVR_status_report() | | |
|       } | | |
|     } | | |
|   } | | |
| } | | |

FIG. 5

| Syntax | No. of Bits | Mnemonic |
|---|---|---|
| DVR_status_report() {<br>   Host_type<br>   if (Host_type==0x01 \|\| Host_type==<br>0x02<br>     \|\| Host_type==0x03) {<br>     DVR_storage_type<br>     DVR_storage_status<br>     DVR_operation_status<br>     reserved<br>     Encryption_status<br>       Storage_usage_status<br>   }<br>} | 8<br><br><br><br>8<br>8<br>8<br>7<br>1<br>8 | uimsbf<br><br><br><br>uimsbf<br>uimsbf<br>uimsbf<br>'1111111'<br>bslbf<br>uimsbf |

BROADCAST RECEIVER, DATA STRUCTURE, AND METHOD FOR PROVIDING DIAGNOSTIC INFORMATION

This application claims the priority benefit of Korean Application No. 10-2005-0104280, filed on Nov. 2, 2005, which is hereby incorporated by reference as if fully set forth therein.

BACKGROUND

1. Field of the Disclosure

The present disclosure relates to content broadcasting technology, and more particularly to a broadcast receiver, data structure, and method for providing diagnostic information.

2. Background

Generally, a broadcast system may include a broadcasting station transmitting contents through wired (e.g., telephone or cable) or wireless (e.g., cellular or satellite) network and at least one host, such as a broadcast receiver, that receives the contents. The broadcast receiver may include a built-in communication interface. Where the broadcast receiver does not have a built-in communication interface, a communication card may be used by the broadcast receiver in order to interface with the broadcasting station.

In the case of cable broadcasting, a cable broadcast system can be divided into a cable broadcast station that transmits cable broadcasts and a cable broadcast receiver that receives cable broadcasts. The cable broadcast station is generally referred to as a System Operator (SO) headend or a Multiple System Operator (MSO) headend. The SO is a local cable/TV broadcast provider and the MSO is a group of system operators.

The cable broadcast receiver may be a digital built-in TV, a digital ready TV, etc. The cable broadcast receiver may adopt an open cable mode and may use a cable card or a Point Of Deployment (POD) module that may include a Conditional Access (CA) system. Alternatively, the cable broadcast receiver may have a built-in module that is a functional equivalent of the cable card. In this instance, the cable broadcast receiver may receive a CA system, in a form of a software, that is downloadable from the SO or MSO and stored in a memory of the cable broadcast receiver. The downloadable software is usually referred to as downloadable conditional access system (DCAS). As such, the cable broadcast receiver may have a configuration that may or may not require a separate cable card.

Where a cable card is required, the cable card may use a Personal Computer Memory Card International Association (PCMCIA) standard in order to interface with the cable broadcast receiver. The cable card may be inserted in a slot provided at the cable broadcast receiver.

Figure 1:
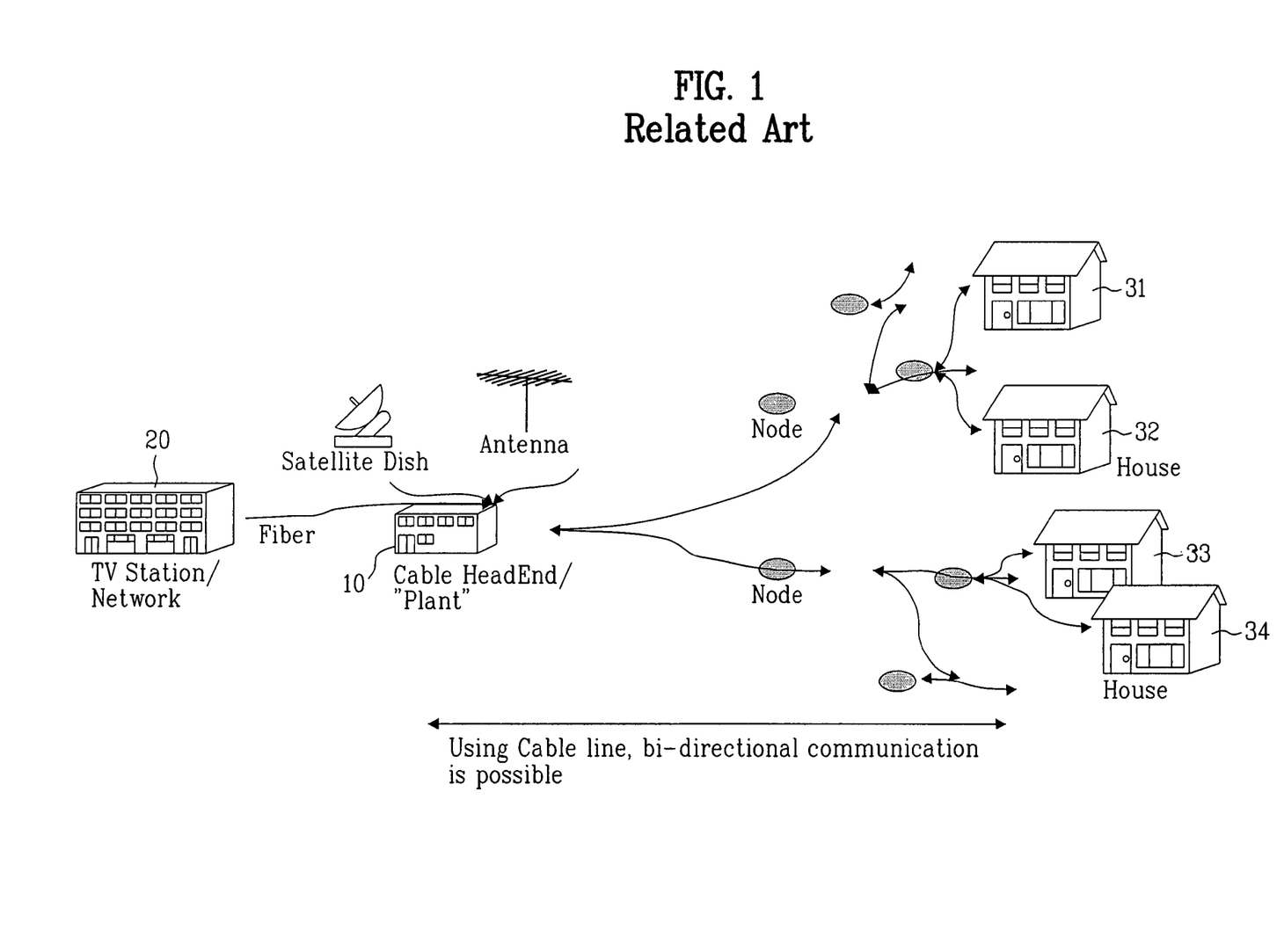
FIG. 1 illustrates an exemplary cable broadcast according to one embodiment of the present invention.

FIG. 1 illustrates an exemplary cable broadcast network. Referring to FIG. 1, a cable headend or plant may receive broadcast signals, for example, from a television broadcast station via a variety of communication networks. The cable headend may deliver cable broadcasts to cable broadcast receivers, where some of the cable broadcast receivers may include cable cards and some may have built-in modules, via a network including nodes. A cable broadcast receiver may receive and transmit signals to and from the cable headend via a cable network that allows bidirectional data communication.

The cable broadcast receiver may be connected to one or more peripheral devices (for example, a digital television, a DVD player, a digital camera, and a set-top box) through various types of interfaces. Alternatively, the cable broadcast receiver may have these one or more peripheral devices built in.

SUMMARY

Accordingly, the present disclosure is directed to broadcast receivers, data structures, and methods for providing diagnostic information.

For example, the disclosure may disclose a cable broadcast receiver and a diagnostic information transmission method, wherein when the cable broadcast receiver includes a Digital Video Recorder (DVR) or the DVR is coupled to the cable broadcast receiver, a status of the DVR may be diagnosed and the diagnostic information may be presented to a cable headend or a user.

The disclosure may disclose a cable broadcast receiver and a diagnostic information transmission method, wherein diagnostic information of a DVR function may be transmitted by incorporating it into a diagnostic information transmission protocol of a cable broadcast receiver in a cable broadcast system.

The disclosure may disclose a cable broadcast receiver and a diagnostic information transmission method, which allow a cable headend to remotely monitor, in real time, DVR functions of a device directly or indirectly coupled to a cable network of the headend, and the cable network has a bidirectional communication capability.

The disclosure may disclose a data structure where DVR function diagnostic information may be communicated between a cable broadcast receiver and a cable card.

Advantages, objects, and features of the invention in part may become apparent in the description which follows and in part may become apparent to those having ordinary skill in the art upon examination of the following or may be learned from practice of the invention. The objectives and other advantages of the various embodiments of the invention may be realized and attained by the structures and processes described in the written description, in the claims, and in the appended drawings.

To achieve these objects and other advantages and in accordance with the purpose of the invention, as embodied and broadly described herein, a host is configured to communicate with a video data recording device, the host including a host controller configured to receive a video data recording device diagnostic information request originated external to the host, and the host controller is further configured to collect the video data recording device diagnostic information from the video data recording device in response to the external request.

In another aspect, a communication device is configured to communicate with a host, the communication device including a controller configured to receive a video data recording device diagnostic information request originated external to the communication device, the controller is further configured to set a value associated with the external request, and to request the video data recording device diagnostic information from the host using the set value.

In another aspect, a method includes receiving a request for video data recording device diagnostic information; collecting the video data recording device diagnostic information in accordance with the request; and forwarding the collected video data recording device diagnostic information.

In another aspect, a method includes requesting video data recording device diagnostic information; receiving the video data recording device diagnostic information in accordance with the request; and performing at least one of forwarding the video data recording device diagnostic information and initiating a signal to display the video data recording device diagnostic information.

In yet another aspect, a data structure includes a first field indicating whether a host has access to a video data recording device, and a second field indicating whether content in a storage medium associated with the video data recording device is encrypted.

It is to be understood that both the foregoing general description and the following detailed description are exemplary and explanatory and should not be construed as limiting the scope of the claims.

BRIEF DESCRIPTION OF THE DRAWINGS

The accompanying drawings, which are included to provide a further understanding of the disclosure are incorporated herein and constitute a part of this application. The drawings, together with the description, serve to explain various embodiments of the invention. In the drawings.

DETAILED DESCRIPTION

Reference will now be made in detail to the preferred embodiments of the present invention, examples of which are illustrated in the accompanying drawings.

As may be described herein, it is possible to monitor the various status or diagnostic information of a host and peripheral devices coupled to the host. In the following, a function to monitor the diagnosis or status of the host or peripheral devices may be referred to as a diagnostic function or a status diagnostic function, and the diagnostic function may be used to refer to a function to check states of the host such as its operating states and its connection states with peripheral devices in certain instances.

Recently, the DVR has attracted considerable attention because it can receive, store, and present cable broadcasts. The DVR could be hardware/software platform in which a user may store digital video content. The DVR may be a standalone device or may be included in a set-top box, a cable broadcast receiver such as a digital television set, a personal video recorder (PVR), and so on.

The DVR may also include an OpenCable Application Platform (OCAP)-DVR that may be used as middleware in an open cable (OpenCable) system, the middleware allowing digital software to be run on a broadcast receiver that serves as hardware.

Figure 2:
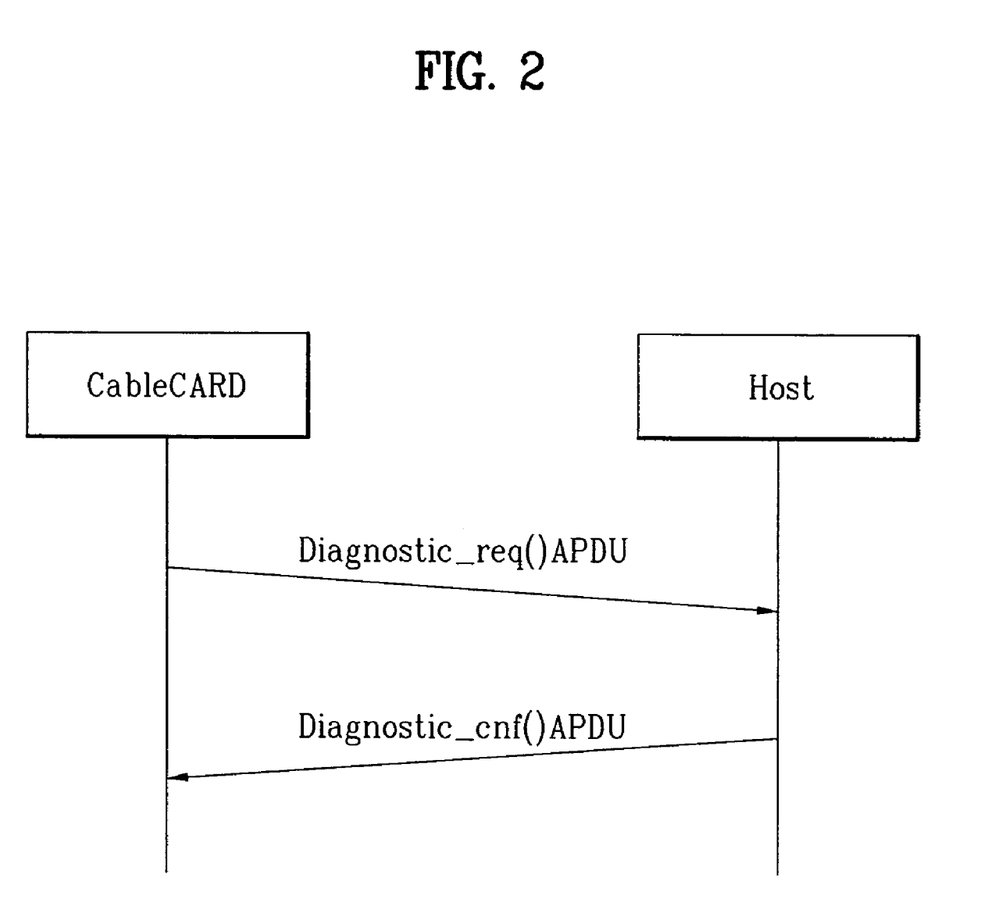
FIG. 2 illustrates how a cable card communicates status diagnostic information with a host according to one embodiment of the present invention.

FIG. 2 illustrates how a cable card may diagnose a status of a host provided with the cable card in response to a command to diagnose the status of the host, received from a cable headend or a user. Upon receiving a command to diagnose the status of a host connected to the cable card from the cable headend or user, the cable card may transmit the diagnostic command to the host according to a predetermined protocol. In response to the diagnostic command, the host may collect its status diagnostic information and may transmit the collected information to the cable card.

An example of the predetermined protocol is a Generic Diagnostic Protocol defined in the open cable system. According to this protocol, the cable card may transmit to the host status diagnostic request command according to a diagnostic request protocol, which is exemplified by "diagnostic_req( ) APDU" in FIG. 2, and the host may transmit the host status diagnostic information according to a diagnostic response protocol, which is exemplified by "diagnostic_cnf( ) APDU" in FIG. 2. Here, the APDU stands for Application Protocol Data Unit.

That is, in FIG. 2, a diagnostic_req( ) APDU and a diagnostic_cnf( ) APDU defined in the generic diagnostic protocol are shown as respective examples of the diagnostic request protocol and the diagnostic response protocol.

When the host collects and transmits its status diagnostic information to the cable card, the cable card may transmit the diagnostic information to the cable headend located at a remote place or may output the diagnostic information to a screen of the host through a cable menu interface implemented in the host.

The cable menu interface may be a user interface that allows a user of the host to confirm diagnostic information corresponding to a diagnostic item selected by the user from a cable menu at the host. The cable menu interface may be transmitted in HTML file format to the host and presented on the screen of the host.

In an embodiment of a method for transmitting diagnostic information of a cable broadcast receiver according to the present invention, when the host can implement a DVR function or is connected to a separate DVR, status diagnostic information of the DVR or the DVR function may be obtained using a specific protocol, for example, the Generic Diagnostic Protocol.

The Generic Diagnostic Protocol is an example transmission protocol that may be used to implement an embodiment of the present invention. However, the present invention is not limited to the Generic Diagnostic Protocol. If a diagnostic information transmission protocol defined in a variety of specifications defined in cable broadcasting is used to transmit diagnostic information, it is possible to achieve compatibility of cable broadcast receivers and diagnostic information transmission methods to which the specifications are applied.

One useful example is to transmit status diagnostic information using the Generic Diagnostic Protocol. A description will now be given of embodiments in which status diagnostic information of the host may be transmitted.

Interfaces between the cable card and the host may be divided into two types, a single-stream cable card interface and a multi-stream cable card interface.

The single-stream cable card interface allows the cable card to process a single broadcast stream and allows the host to decode a single broadcast stream. The multi-stream cable card interface allows the cable card to process a plurality of multiplexed broadcast streams and allows the host to decode a plurality of multiplexed broadcast streams.

Thus, the two modes may be described here, one in which the cable card processes a single stream, which is hereinafter referred to as an S-mode, and the other in which the cable broadcast receiver receives multiple streams, which is hereinafter referred to as an M-mode.

In the method for transmitting diagnostic information of a cable broadcast receiver, first, diagnostic identifications (IDs) of diagnostic information of a DVR function may be separately defined to obtain DVR status diagnostic information associated with the DVR.

Table 1 represents an example of DVR status information used in the diagnostic information transmission method for the cable broadcast receiver according to one embodiment of the present invention.

TABLE 1

| Diagnostic | Value |
| --- | --- |
| Host memory allocation | 0x00 |
| Application version number | 0x01 |
| Firmware version | 0x02 |
| MAC address | 0x03 |
| FAT status | 0x04 |
| FDC status | 0x05 |
| Current Channel Report | 0x06 |
| 1394 port | 0x07 |
| DVI_status | 0x08 |
| eCM | 0x09 |
| HDMI Port status | 0x0A |
| RDC status | 0x0B |
| OCHD2 Network Address | 0x0C |
| DVR status | 0x0D |
| Reserved | 0x0E~0xFF |

If the cable card requests the cable broadcast receiver to provide status information, using a diagnostic ID value of "0x0D" according to the diagnostic request protocol, the cable broadcast receiver may request the DVR for the information, may create and transmit DVR status diagnostic information, collected using the diagnostic ID value, to the cable card according to the diagnostic response protocol.

For example, a diagnostic ID value of "0x08" is used when the cable card requests the cable broadcast receiver to create DVI status information. A diagnostic ID value of "0x0A" is used when the cable card requests the cable broadcast receiver to check the status of a High Definition Multimedia Interface (HDMI) port. Other diagnostic ID values can be used to obtain a variety of diagnostic information (eCM, RDC status, and OCHD2 Network Address).

Figure 3:
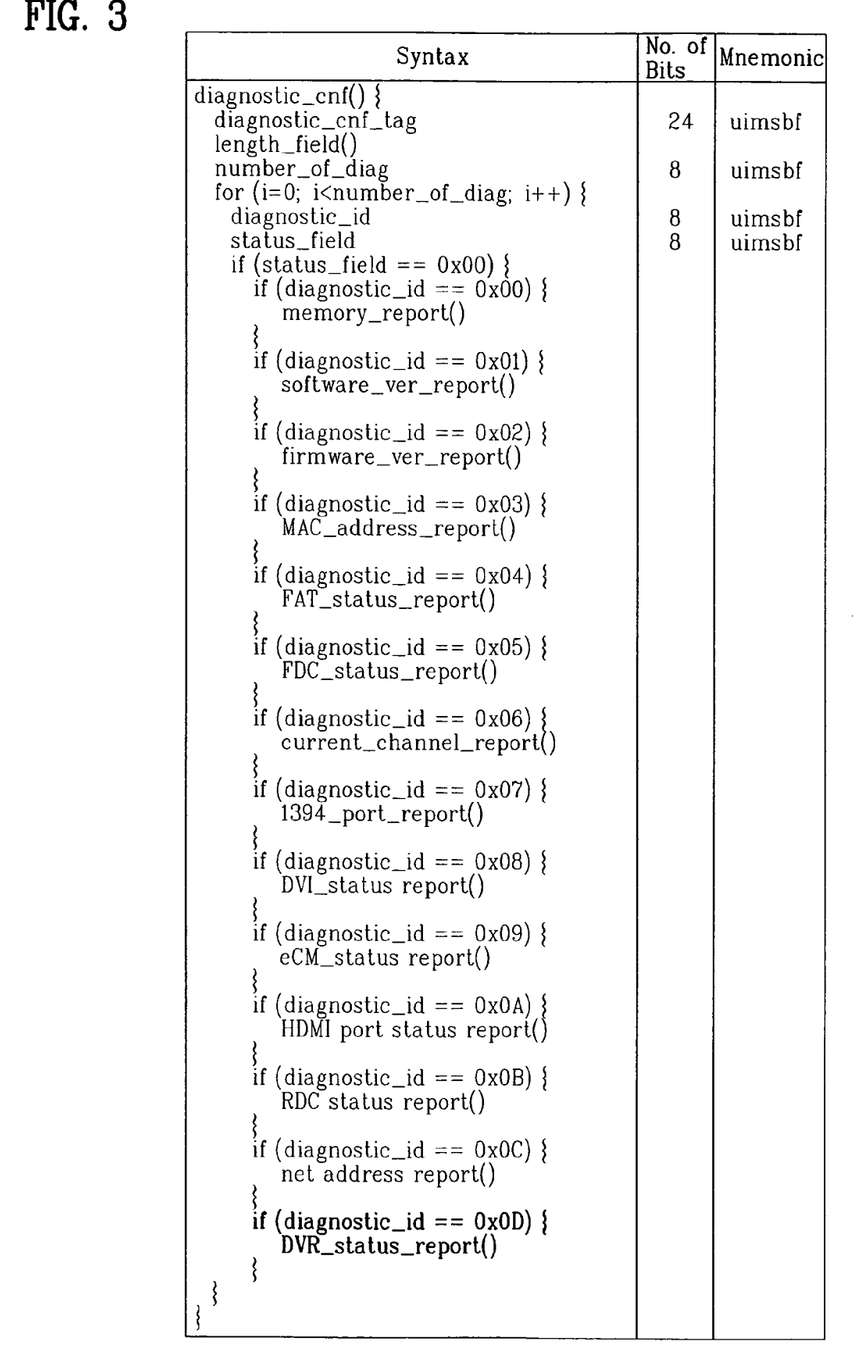
FIG. 3 illustrates an example syntax defined for signals received by the cable card according to a status diagnostic response protocol in a diagnostic information transmission method according to one embodiment of the present invention.

FIG. 3 illustrates an example syntax defined for signals according to a status diagnostic response protocol in the S-mode in which a single stream is received in the diagnostic information transmission method according to one embodiment of the present invention.

In an example which uses Table 1, in order to obtain DVI status information, the cable card may set the diagnostic ID to "0x08" and may transmit a diagnostic request signal with the diagnostic ID to the cable broadcast receiver.

The cable broadcast receiver may collect DVI status diagnostic information, may create, and may transmit a diagnostic result to the cable card according to the diagnostic response protocol. First, the cable card may parse the number of diagnostic information items (number_of_diag) included in the status diagnostic information transmitted by the cable broadcast receiver. The cable card then may activate an object "DVI_status_report( )" corresponding to the diagnostic ID "0x08" to obtain the DVI status information and then may transmit it to the cable headend.

Using the syntax, the cable card may parse the DVR status information signal that the cable broadcast receiver has created according to the status diagnostic response protocol.

In the above example, which uses Table 1, the diagnostic ID for DVR status information may be defined as "0x0D". When this definition is employed in the example of FIG. 3, the cable card may receive collected DVR status information and may activate a DVR_status_report( ) corresponding to the diagnostic "0x0D" to obtain the DVR status information.

Figure 4:
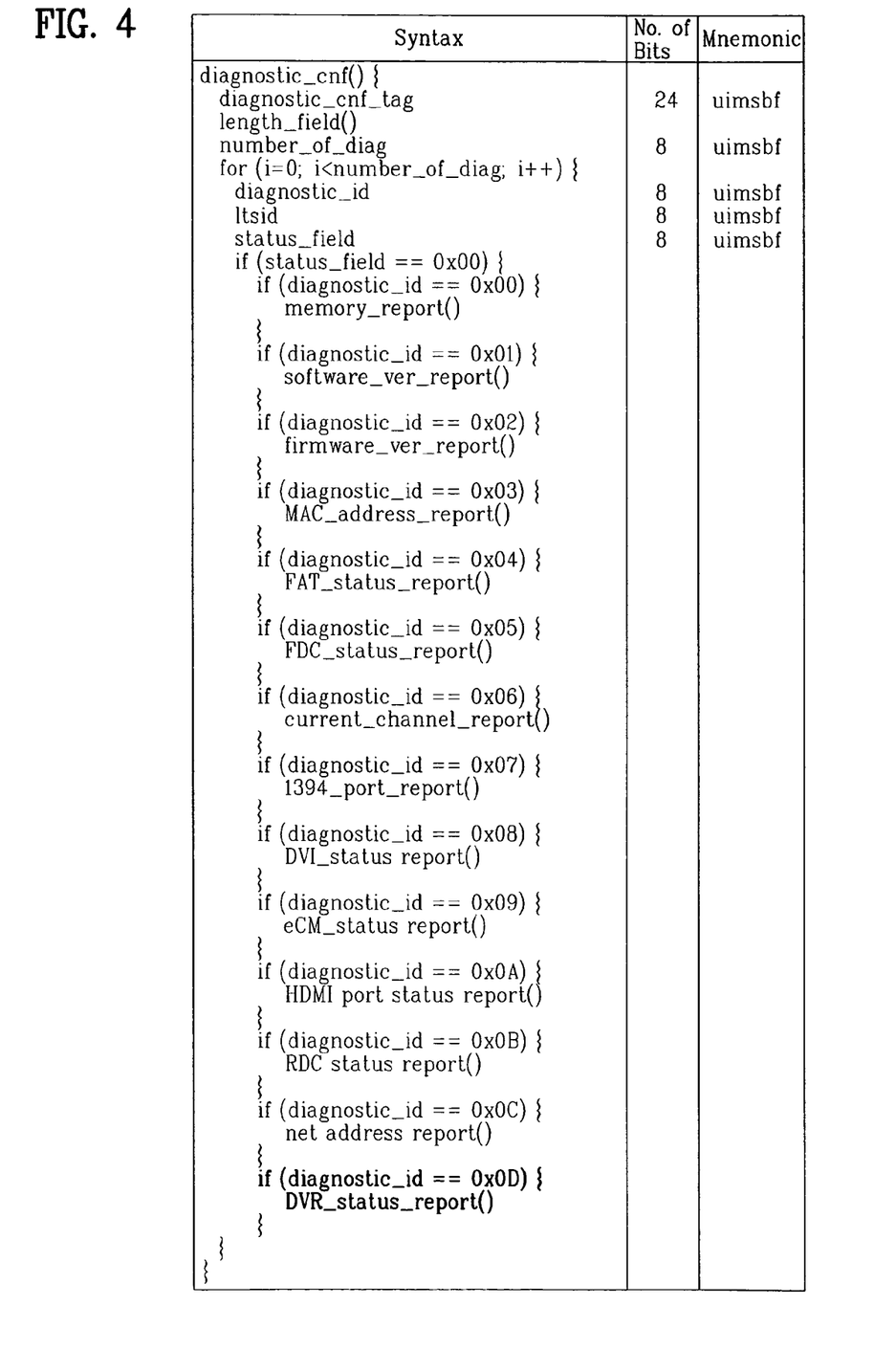
FIG. 4 illustrates another example syntax defined for signals received by the cable card according to the status diagnostic response protocol in the diagnostic information transmission method according to one embodiment of the present invention.

FIG. 4 illustrates an example syntax defined for signals according to the diagnostic response protocol in the M-mode in which the cable broadcast receiver receives and multiplexes a plurality of broadcast streams in the diagnostic information transmission method according to one embodiment of the present invention.

The syntax of FIG. 4 significantly differs from that of FIG. 3 in that respective local transport stream IDs (ltsid) of the multiplexed streams are declared in the syntax. Also in the example of FIG. 4, the cable card may receive collected DVR status information and may activate a DVR_status_report( ) corresponding to the diagnostic ID "0x0D" to obtain the DVR status diagnostic information.

In an embodiment of the diagnostic information transmission method for the cable broadcast receiver according to the present invention, the DVR status diagnostic information may include information indicating whether or not there is DVR has a DVR function, status information of a DVR storage for the DVR function, information indicating a currently active feature of the DVR function, information indicating whether or not content stored by the DVR has been encrypted, and information indicating the amount of a currently used space of the DVR storage.

Figure 5:
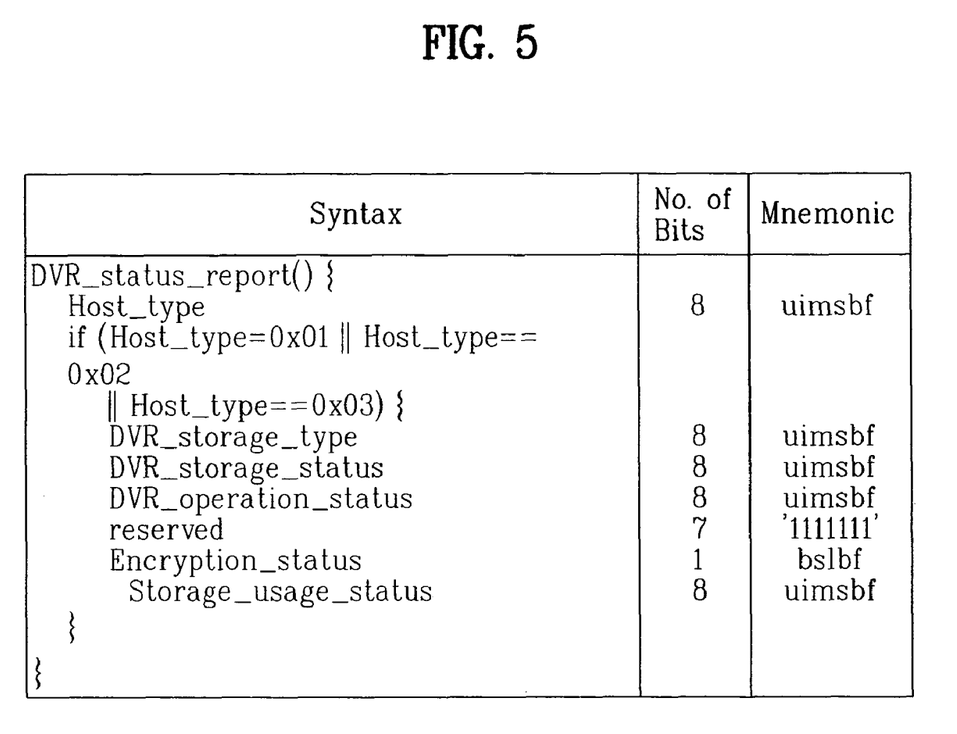
FIG. 5 illustrates an example syntax for parsing DVR status diagnostic information in the diagnostic information transmission method according to one embodiment of the present invention.

FIG. 5 illustrates an example of the object "DVR_status_report( )" included in each of the syntaxes of FIGS. 3 and 4. An example of the syntax used when the cable card parses the diagnostic response protocol according to an embodiment of the diagnostic information transmission method for the cable broadcast receiver according to one embodiment of the present invention will now be described with reference to FIG. 5.

When the cable broadcast receiver transmits DVR status information, collected with the diagnostic ID value "0x0D" shown in Table 1, using the status diagnostic response protocol, the cable card may obtain status diagnostic information using the object "DVR_status_report( )" shown in FIG. 5.

The DVR status diagnostic information may include information illustrated in FIG. 5. In the example of FIG. 5, information "Host_type" may indicate whether or not the cable broadcast receiver has a DVR function or is associated with a DVR.

Examples of defined values of "Host_type" include "0x00" indicating that the cable broadcast receiver has no DVR function (or capability) or is not associated with a DVR, "0x01" indicating that the DVR has an OpenCable Application Platform (OCAP)-DVR function, "0x02" indicating that the DVR has a DVR function native to the manufacturer of the cable broadcast receiver, "0x03" indicating that the DVR has a different type of DVR function, and "0x04"-"0xFF" that are reserved.

In FIG. 5, if the value of "Host_type" is 0x01, 0x02, or 0x03, the cable broadcast receiver has a DVR function.

Information "DVR_storage_type" in the syntax of FIG. 5 indicates the type of a storage medium in which the DVR stores content for the DVR function.

Examples of defined values of "DVR_storage_type" include "0x00" indicating an internal Hard Disk Drive (HDD), "0x01" indicating an external HDD, "0x02" indicating a flash memory, "0x03" indicating a memory card, "0x04" indicating a different type of memory from these types, and "0x05"-"0xFF" that are reserved.

Information "DVR_storage_status" in the syntax of FIG. 5 indicates the physical status of a storage medium in which the DVR stores content for the DVR function.

Examples of defined values of "DVR_storage_status" include "0x00" indicating that the status of the storage is OK, "0x01" indicating that the storage has not been formatted, "0x02" indicating that the storage has a bad sector, "0x03" indicating that the storage is out of order, and "0x04"-"0xFF" that are reserved.

Information "DVR_operation_status" in the syntax of FIG. 5 indicates the operating status of a DVR function included in the DVR or the operating status of a DVR supported by the DVR. Examples of defined values of "DVR_operation_status" include "0x01" indicating that the DVR function is disabled (i.e., off), "0x02" indicating that a time shift feature of the DVR function is enabled (i.e., active), "0x03" indicating that a recording feature of the DVR function is enabled (i.e., active), and "0x04"-"0xFF" that are reserved.

The time shift feature is a feature to select, pause, and play a current digital event, which is different from the recording feature to store a current event in order to select or view the event at a later time.

Information "Encryption_status" in the syntax of FIG. 5 indicates whether or not content stored in the HDD through recording of the DVR has been encrypted.

Examples of defined values of "Encryption_status" include "$0_2$" indicating that the content has not been encrypted (i.e., encryption is disabled) and "$1_2$" indicating that the content has been encrypted (i.e., encryption is enabled).

Information "Storage_usage_status" in the syntax of FIG. 5 may indicate the usage status of a storage for digital content (for example, a hard disk).

Examples of defined values of "Storage_usage_status" include "0x00" indicating that the storage is empty, "0x01" indicating that less than 25% of the storage is used, "0x02" indicating that less than 50% of the storage is used, "0x03" indicating that less than 75% of the storage is used, "0x04" indicating that the storage is full (i.e., 100% of the storage is used), and "0x05"-"0xFF" that are reserved.

The storage usage status information may be expressed in bytes.

The DVR status diagnostic information and the values thereof described above are only illustrative and can be easily modified by those skilled in the art.

Figure 6:
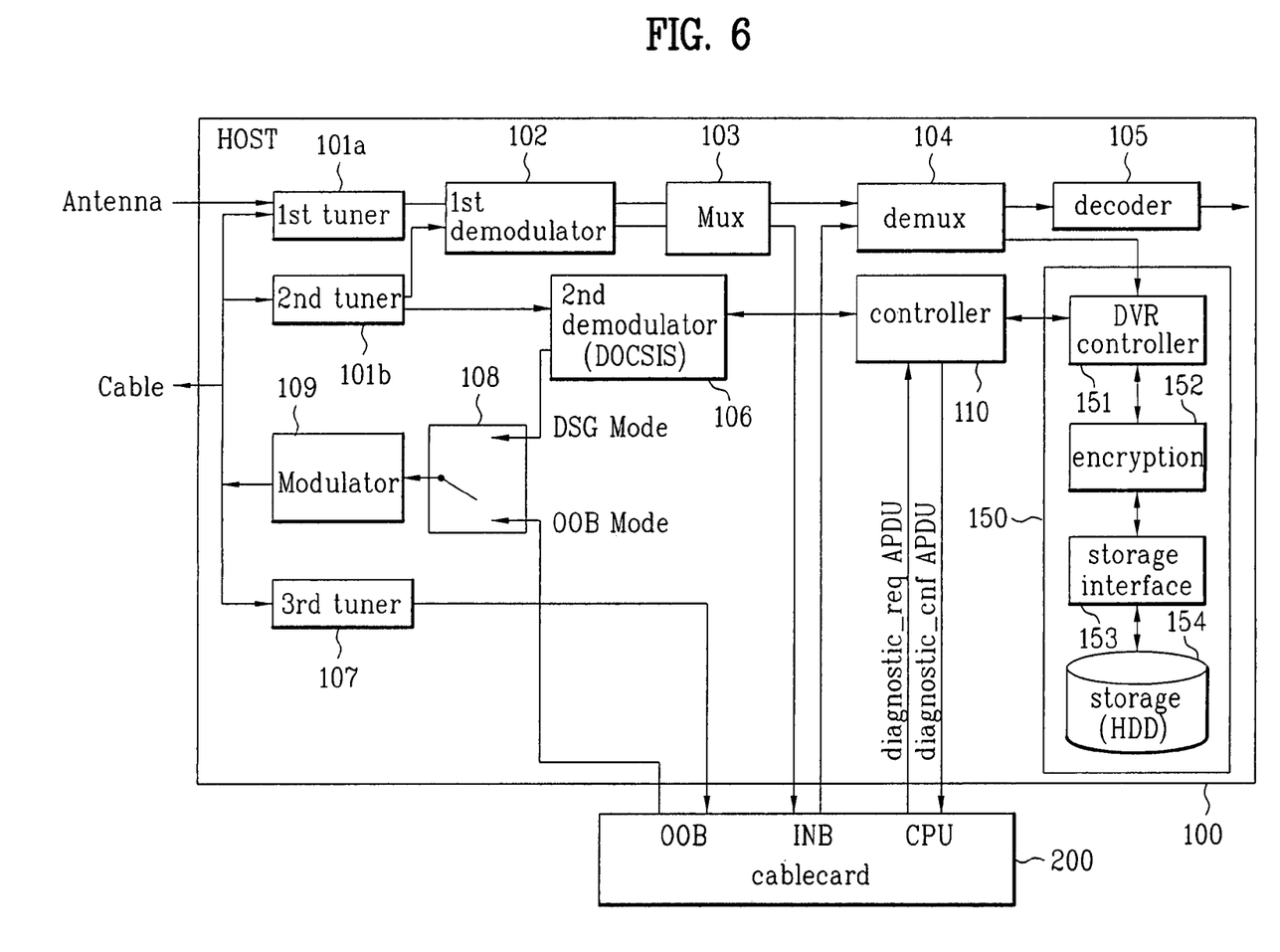
FIG. 6 is a block diagram of an exemplary cable broadcast receiver according to one embodiment of the present invention.

FIG. 6 is a block diagram of an embodiment of a cable broadcast receiver according to one embodiment of the present invention. A description of how the cable broadcast receiver according to the present invention operates will now be given with reference to FIG. 6.

The cable broadcast receiver 100 according to the present invention includes a cable card 200 that can be detachably coupled to the cable broadcast receiver 100. Generally, a broadcast receiver can receive a cable broadcast signal alone or can receive one or more of a cable broadcast signal, a terrestrial broadcast signal, and a satellite broadcast signal. In this embodiment, it is assumed that the cable broadcast receiver may receive one or more of a cable broadcast signal, a terrestrial broadcast signal, and a satellite broadcast signal.

Bidirectional communication between the cable broadcast receiver and the broadcast station may be performed in two modes. Specifically, Out Of Band (OOB) and Data Over Cable Service Interface Specification (DOCSIS) Settop Gateway (DSG) modes may be applied to provide upstream services in an open cable system. These modes allow users to select and view desired programs through the cable broadcast receiver and also to participate in a broadcast program or to select and view desired information. Data broadcast services may also be provided using the OOB and DSG modes.

The OOB mode is a mode defined for transmission between a cable broadcast station (headend) and InterSec equipment in a set-top box. The DSG mode is a mode defined for transmission between a cable modem control system in a cable broadcast station and a DOCSIS-based cable modem in a set-top box. The DOCSIS is a specification for digital cable televisions adopted by CableLabs, which is the US-based cable broadcast standardization and certification institute. In this specification, data can be transmitted using a cable modem.

The cable broadcast receiver in the embodiment of FIG. 6 uses a hybrid OOB/DSG mode.

In the embodiment of FIG. 6, the cable broadcast receiver 100 may include a first tuner 101a, a second tuner 101b, a demodulator 102, a multiplexer 103, a demultiplexer 104, a decoder 105, a second demodulator 106, an OOB receiver 107, a switching unit 108, a controller 110, and a DVR block 150.

The DVR block 150 is a block for performing a DVR function. In the cable broadcast receiver, the DVR block 150 may be an embedded block in the cable broadcast receiver or may be a separate block that is provided outside the cable broadcast receiver. When the DVR block 150 is a separate block provided outside the cable broadcast receiver, the DVR block 150 and the cable broadcast receiver 100 may communicate signals with each other through an interface provided between the DVR block 150 and the cable broadcast receiver 100.

In the embodiment of FIG. 6, the DVR block 150 is provided inside the cable broadcast receiver. Those skilled in the art will appreciate that the same principle as described below can be applied even when the DVR block is provided outside the cable broadcast receiver.

The first tuner 101a may be tuned to a specific channel frequency to select a corresponding broadcast among terrestrial Audio/Video (A/V) broadcasts received through an antenna or cable A/V broadcasts received in band through a cable and may output the selected broadcast signal to the first demodulator 102.

Terrestrial and cable broadcasts use different transmission schemes. The first demodulator 102 may perform different demodulation processes for signals of different demodulation schemes. If terrestrial A/V broadcasts are transmitted after being modulated according to a vestigial sideband modulation (VSB) scheme and cable A/V broadcasts are transmitted after being modulated according to a Quadrature Amplitude Modulation (QAM) scheme, the first demodulator 102 may demodulate a signal selected by the first tuner 101a according to the VSB scheme or the QAM scheme determined based on the signal.

The multiplexer 103 may multiplex signals demodulated by the first demodulator 102, and may output a cable broadcast signal to the cable card 200 and a terrestrial broadcast signal to the demultiplexer 104.

In the embodiment of FIG. 6, it is assumed that the cable card 200 can process multiple streams. Thus, the cable card 200 allows the user to watch a received broadcast, into which two or more streams have been multiplexed, through the cable broadcast receiver 100.

The demultiplexer 104 may receive and separate a multiplexed broadcast signal into a plurality of streams. The decoder 105 may decode a received broadcast signal into a video/audio signal that can be viewed by the user.

The second tuner 101b may be tuned to a specific channel frequency to select a corresponding broadcast among data broadcasts, which are received through the cable according to the DSG mode, and may output the selected broadcast signal to the second demodulator 106. The second demodulator 106 may demodulate a data broadcast of the DSG mode and may output the demodulated broadcast signal to the controller 110.

The third tuner (specifically, an OOB receiver) 107 may be tuned to a specific channel frequency to select a corresponding broadcast among downstream data broadcasts, which are received through the cable according to the OOB mode, and may output the selected channel signal to the cable card 200.

When bidirectional communication is possible between the cable broadcast station and the cable broadcast receiver, the cable broadcast receiver may transmit upstream information, which contains, for example, a pay program request and diagnostic information, to the cable broadcast station according to the OOB or DSG mode. In an embodiment of the present invention, the cable broadcast receiver may include the switching unit 108 which makes it possible to select one of the above modes for data transmission.

In the OOB mode, user information or system diagnostic information is output to a modulator 109 through the cable card 200 and the switching unit 108, and the modulator 109 may modulate the output signal using QPSK modulation or the like and may transmit it to the cable broadcast station through the cable.

When broadcast information of the user may be transmitted in the DSG mode, the information may be output to the modulator 109 through the cable card 200 and the switching unit 108, and the modulator 109 may modulate the output signal using QAM-16 modulation or the like and may transmit it to the cable broadcast station through the cable.

The DVR block 150 may include a DVR controller 151, an encryption unit 152, a storage interface 153, and a storage 154.

The DVR block 150 may store a broadcast stream of digital content received from the demultiplexer 104. The DVR controller 151 may receive and output a broadcast stream from the demultiplexer 104 and the encryption unit 152 may encode a signal output from the DVR controller 151. The encoded signal may be stored in a hard disk drive, which is an example of the storage 154, via the storage interface 152.

When DVR status diagnostic information of the host controller 110 is received, the DVR controller 151 may collect and transmit the DVR status diagnostic information to the controller 110 and the controller 110 may transmit the DVR status diagnostic information to the cable card.

In the embodiment of FIG. 6, if the received broadcast is a terrestrial broadcast, the cable card 200 may receive a multi-stream broadcast signal from the multiplexer 103. If the broadcast signal has been scrambled, the cable card 200 may descramble the broadcast signal so that a corresponding cable broadcast can be viewed properly.

Using a host status diagnostic request protocol, the cable card 200 may request that the controller 110 in the cable broadcast receiver 100 to diagnose the status of the DVR. The controller 110 may transmit the DVR status diagnostic information to the DVR controller 151 and the DVR controller 151 may collect the DVR status diagnostic information.

The host controller 110 may receive the collected DVR status diagnostic information from the DVR controller 151 and transmit the status diagnostic information to the cable card according to a status diagnostic response protocol. In FIG. 6, a diagnostic_req APDU is shown as an example of the status diagnostic request protocol and a diagnostic_cnf( ) APDU is shown as an example of the status diagnostic response protocol.

The cable broadcast receiver 100 may create and transmit DVR status diagnostic information to the cable card 200 through the procedure described above not only when the cable broadcast receiver 100 includes a DVR block 150 having a DVR function, but also when it is connected to an external DVR (not shown).

The cable card 200 may transmit the status diagnostic information to the cable headend through the cable so that the cable headend may obtain DVR status information associated with each host. Although the cable card may transmit DVR status information to the cable headend in the above example, a broadcast receiver including a smart card rather than the cable card may transmit its status information to a broadcast transmitting side. Those skilled in the art will appreciate that, when a broadcast receiver includes a status diagnostic unit that can diagnose the status of the broadcast receiver and transmit its diagnostic information, the broadcast receiver may transmit the information to the broadcast transmitting side according to the method described above.

Figure 7:
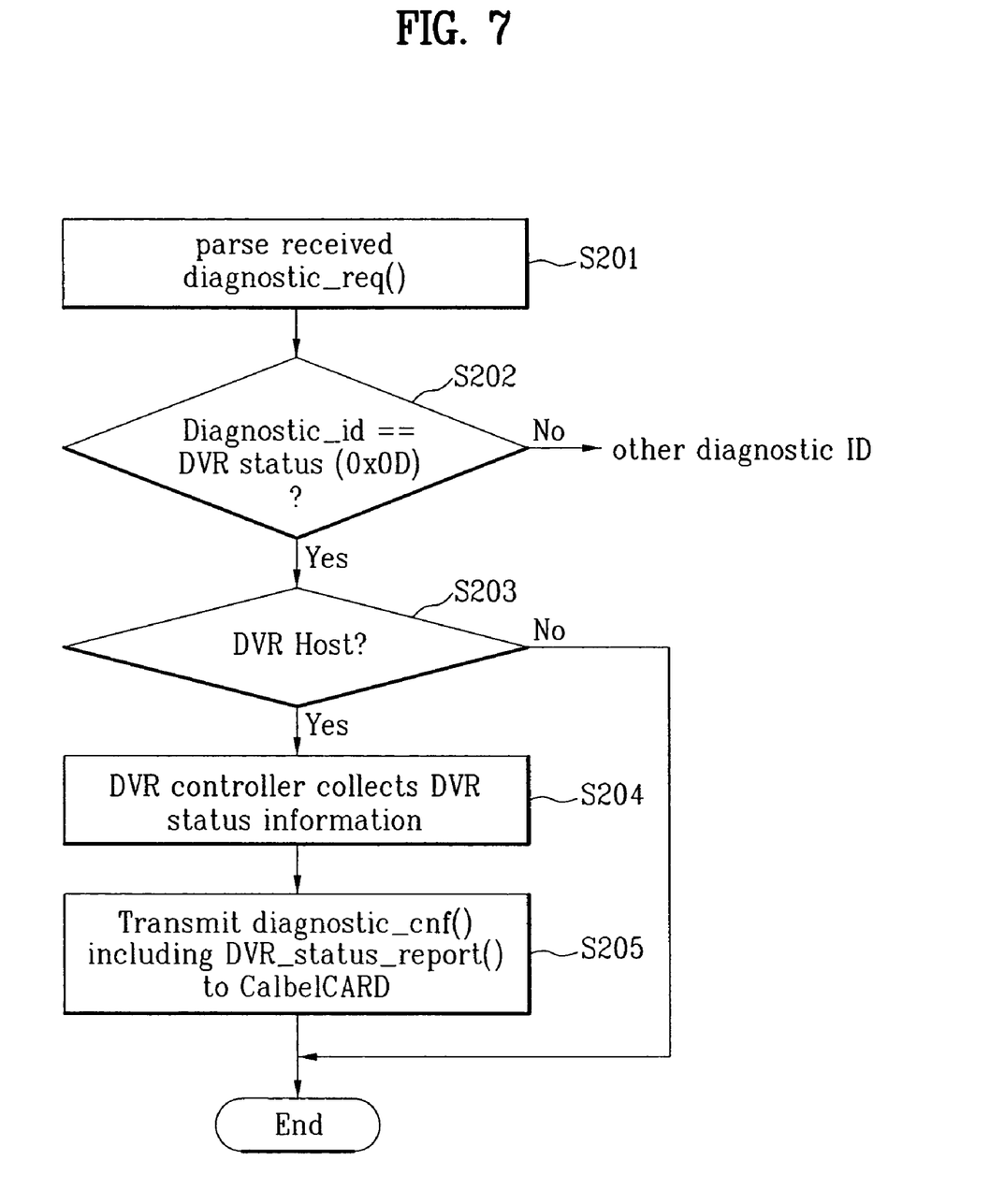
FIG. 7 is an exemplary flow chart of a diagnostic information transmission method according to one embodiment of the present invention.

FIG. 7 is a flow chart of an embodiment of a method for transmitting status diagnostic information according to one embodiment of the present invention. The process of the flow chart may be performed by a controller of a broadcast receiver. The method for transmitting the status diagnostic information will now be described with reference to FIG. 7.

At step S201, a request for status diagnostic information is received and parsed. Then at step S202, a determination is made whether or not DVR status diagnostic information is included in a diagnostic ID field among the fields of the parsed information. If it is determined that the DVR status diagnostic information is included in the diagnostic ID field, the process continues to step S203. At step S203, a determination is made whether or not there is a DVR function or a DVR that can be diagnosed.

If there is a DVR function or a connected DVR, the process continues to step S204. At step S204, DVR status diagnostic information is collected.

Upon receiving DVR status diagnostic information from the DVR controller, at step S205, the DVR status diagnostic information may be transmitted to a requesting source. Alternatively, at step S202, if the request is not for DVR status diagnostic information, the process continues to determine which status diagnostic information is being requested.

Accordingly, the exemplary cable broadcast receiver and the exemplary diagnostic information transmission method may allow the cable headend to obtain DVR status diagnostic information. By extending and using a protocol defined in a variety of specifications such as the generic diagnostic protocol, the diagnostic information method may achieve compatibility of such information transmitted between the cable card and the cable broadcast receiver.

As may be apparent from the above description, a disclosed cable broadcast receiver and diagnostic information transmission method may have the following advantages.

When a cable broadcast receiver has a DVR function or is connected to a DVR, it is possible to diagnose the status of the DVR or the DVR function and to present its status diagnostic information to the user or to the cable headend. A cable headend can remotely monitor, in real time, DVR functions of cable broadcast receivers that are connected to a cable network of the headend and that have a bidirectional communication capability.

The present disclosure has been described using broadcast receivers in which the broadcast receivers may have terrestrial analog/digital channels, and cable analog/digital channels. With modifications known to those skilled in the art, the present disclosure can be implemented in any terrestrial wired (e.g., telephone) and wireless (e.g., cellular) networks and satellite networks.

It will be appreciated that, in various of the above-disclosed and other features and functions, or alternatives thereof, they may be implemented on a programmed microprocessor, a microcontroller, an integrated circuit element such as ASIC, PLD, PLA, FPGA, or PAL, or the like, a hardwired electronic or logic circuit, or a programmable logic device.

It will be appreciated that the described flow processes, data structures, protocols, or tables can be implemented as a self-consistent sequence of computerized steps that lead to a desired result. These steps can be defined by and/or in one or more computer instructions stored in a computer-readable medium, or can be encompassed using a signal, or provided as software instructions to a processing device. These steps can be performed by a processor executing the instructions that define the steps. Further, the flow process can be performed by a processor executing one or more appropriate programs, by special purpose hardware designed to perform the method, or any combination of such hardware, firmware and software elements.

It will be appreciated that various of the above-disclosed and other features and functions, or alternatives thereof, may be desirably combined into many other different devices or applications. Also, various presently unforeseen or unanticipated alternatives, modifications, variations or improvements therein may be subsequently made by those skilled in the art, and are also intended to be encompassed by the following claims.

What is claimed is:

1. A cable card configured to communicate with a host in an open cable system, the cable card comprising:
    a controller configured to receive a recording device diagnostic request originated external to the cable card; and
    the controller further configured to request recording device diagnostic information to the host using a generic diagnostic method, receive the requested recording device diagnostic information from the host and control to forward the received recording device diagnostic information to a headend,
    wherein the cable card is configured to parse the recording device diagnostic information in accordance with a predetermined protocol,
    wherein the host has a storage, and
    wherein when the storage is a digital video recorder (DVR), the requested recording device diagnostic information includes a host type indicating a DVR function which the host has, a storage type indicating a type of the storage, a status of the storage, and a DVR operation status indicating an operation function of the DVR,
    wherein the host type includes information indicating whether or not the DVR is operated by an open cable application platform (OCAP)-DVR function,
    wherein the recording device diagnostic information includes a DVI status information, a HDMI status information, and other diagnostic information based on the diagnostic ID value.

2. The cable card of claim 1, wherein the predetermined protocol includes Generic Diagnostic Protocol.

3. The cable card of claim 1, wherein the controller is configured to process the recording device diagnostic information suitable for display at the host.

4. The cable card of claim 1, wherein the DVR operation status includes information indicating whether or not the DVR has a time shift function.

5. A method of communicating between a host and a cable card in an open cable system, the method comprising the steps of:
    receiving a request for recording device diagnostic information from the cable card;
    collecting the recording device diagnostic information in accordance with the request;
    forwarding the collected recording device diagnostic information to the cable card using a generic diagnostic method; and
    parsing a request for a value that identifies that the request is for the recording device diagnostic information,
    wherein the host has a storage,
    wherein when the storage is a digital video recorder (DVR), the recording device diagnostic information includes a host type indicating a DVR function which the host has, a storage type indicating a type of the storage, a status of the storage and a DVR operation status indicating an operation function of the DVR, and
    whether or not the DVR is operated by an open cable application platform (OCAP)-DVR function,
    wherein the recording device diagnostic information includes a DVI status information, a HDMI status information, and other diagnostic information based on the diagnostic ID value.

6. A method of communicating between a host and a cable card in an open cable system, the method comprising the steps of:
    requesting recording device diagnostic information to the host using a generic diagnostic method;
    receiving the recording device diagnostic information from the host in accordance with the request using the generic diagnostic method; and
    performing at least one of forwarding the received recording device diagnostic information to a head end; and
    parsing the recording device diagnostic information in accordance with a predetermined protocol,
    wherein the recording device diagnostic information includes a host type indicating a digital video recorder (DVR) function which the host has, a type of a storage in the host, a status of the storage and a DVR operation status indicating an operation function of the DVR,
    whether or not the DVR is operated by an open cable application platform (OCAP)-DVR function,
    wherein the recording device diagnostic information includes a DVI status information, a HDMI status information, and other diagnostic information based on the diagnostic ID value.

7. The method of claim 6, further comprising the step of forwarding the parsed recording device diagnostic information to the head end.

8. The method of claim 5, wherein the DVR operation status includes information indicating whether or not the DVR in the host has a time shift function.

9. The method of claim 5, wherein the status of the storage includes one of information indicating whether the storage is formatted, information indicating whether the storage has a bed sector, and information indicating whether the storage is out of order.

10. The method of claim 6, wherein the DVR operation status includes information indicating whether or not the DVR in the host has a time shift function.

11. The method of claim 6, wherein the status of the storage includes one of information indicating whether or not the storage is formatted, information indicating whether or not the storage has a bad sector, and information indicating whether or not the storage is out of order.

12. A method of communicating between a host and a cable card in an open cable system, the method comprising:

requesting, by the cable card, recording device diagnostic information to the host using a generic diagnostic method;

receiving, by the host, the recording device diagnostic information in accordance with the request using the generic diagnostic method; and performing, by the host, at least one of forwarding the recording device diagnostic information to a head end and initiating a signal to display the recording device diagnostic information; and parsing by the cable card, the recording device diagnostic information in accordance with a predetermined protocol, wherein the recording device diagnostic information includes a host type indicating a digital video recorder (DVR) function which the host has, a type of a storage in the host, a status of the storage and a DVR operation status indicating an operation function of the DVR, and wherein the host type includes information indicating whether or not the DVR is operated by an open cable application platform (OCAP)-DVR function, wherein the recording device diagnostic information includes a DVI status information, a HDMI status information, and other diagnostic information based on the diagnostic ID value.

* * * * *